Figure 1:
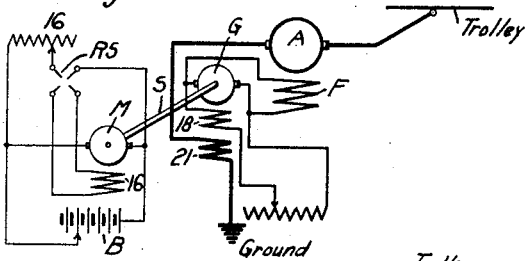

R. E. HELLMUND.
CONTROL SYSTEM.
APPLICATION FILED NOV. 7, 1917.

1,312,785.

Patented Aug. 12, 1919.

WITNESSES:
J. T. Wurmb.
W. R. Coley

INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,312,785.  Specification of Letters Patent.  Patented Aug. 12, 1919.

Original application filed September 25, 1914, Serial No. 863,504. Divided and this application filed November 7, 1917. Serial No. 200,657.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Control Systems, of which the following is a specification, this application being a division of my copending application, Serial No. 863,504, filed September 25, 1914, patented December 11, 1917, No. 1,249,954.

My invention relates to systems of control, and it has special reference to means for preventing the occurrence of "flash-over" conditions in dynamo-electric machines, more particularly electric railway motors, under predetermined conditions.

One object of my invention is to provide simple and reliable means of the above-indicated character which shall effectively obviate the possibility of "flash-over" of electric motors upon the resumption of supply-circuit voltage after a temporary interruption thereof, such as is caused by the trolley wheel or other current-collecting member passing under a section break or otherwise momentarily leaving the supply-circuit conductor.

More particularly, in high-voltage direct current systems and in the case of locomotives of large capacity, it may be advisable, for economical and other reasons, to provide means for preventing "flash-over" of the motor, the most common cause of which is the sudden resumption of supply-circuit energy after the temporary interruption thereof at section breaks, etc. Whenever the supply of energy is resumed, a heavy rush of current through the deënergized motor windings occurs, which causes great field-flux distortion and relatively high voltage between commutator segments. This condition arises by reason of the fact that the flux set up by the armature current, upon resumption of supply-circuit energy, readily traverses the entirely laminated armature core, and, consequently, builds up to a normal value much more rapidly than the main field flux which encounters the high magnetic reluctance of the solid iron or steel frame castings and which is, therefore, partly damped out by eddy currents.

According to my present invention, I provide various modifications of means for obviating the above-mentioned operating difficulties by energizing a part or all of the main field windings from some auxiliary source of energy when the supply-circuit energy is temporarily interrupted. The main field flux is thus maintained at a predetermined value during the interruption and, as a result, when the supply-circuit energy is resumed, the predominance of armature ampere-turns over field ampere-turns is prevented, and "flash-over" conditions do not obtain.

Figure 2:
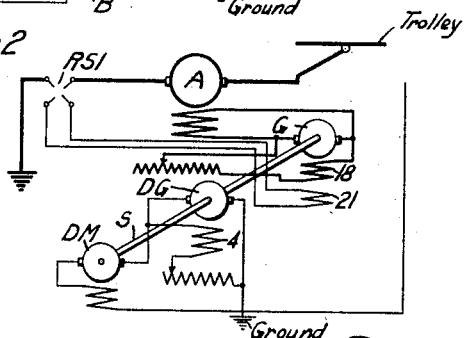
Figure 3:
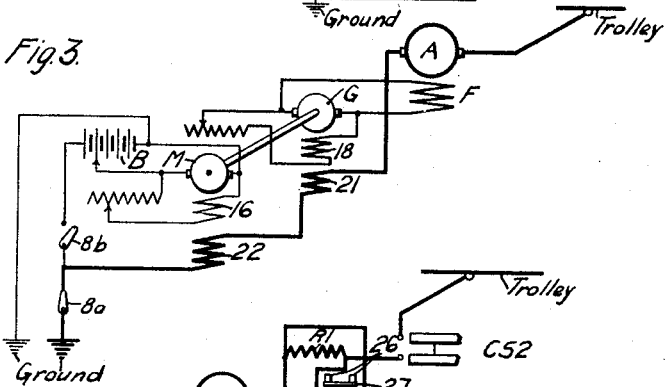
Figure 4:
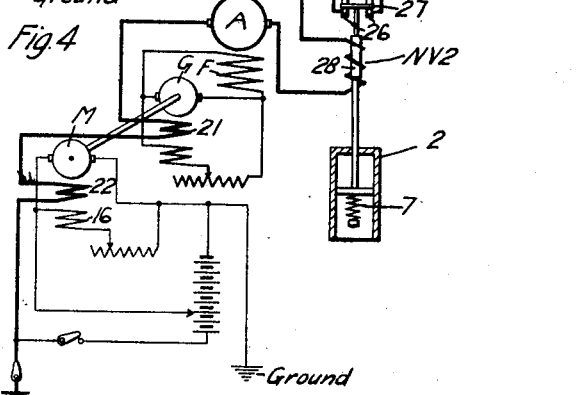

In the accompanying drawing, Figure 1 is a diagrammatic view of a system of control embodying my invention; and Fig. 2, Fig. 3 and Fig. 4 are similar views of modifications of the invention.

The system shown in Fig. 1 comprises a suitable supply circuit including conductors Trolley and Ground; a main propelling motor having an armature A and a single-part main field winding F; and a motor-generator set having a motor M that is driven from a variable battery B and is provided with a variable shunt field winding 16 which may be reversed by a suitable reversing switch RS, and a generator G that is provided with a variable shunt field winding 18 and a series field winding 21 which is connected in circuit with the main armature A, the generator G being connected to energize the main field winding F.

Although no part of the field winding F is connected in circuit with the main motor armature A during emergency conditions, the series characteristic of the main motor is, nevertheless, maintained to a very large extent by the use of the series-connected field winding of the generator G. The shunt field winding 18 is merely strong enough to maintain a predetermined energization of the main field winding F upon a temporary interruption of supply circuit energy, and is also adapted to permit of ready means for "field control", if desired.

However, the generator field winding 18 may be omitted in many cases, because, with very short interruptions of energy, the self-induction of the main field winding F will prevent the field current from dying out rapidly. Longer interruption of supply-circuit voltage may be compensated for by means of a suitable automatic switching device, such as is illustrated in my aboveidentified copending application. In case the shunt filed winding 18 is omitted, a very desirable series characteristic may be obtained for the main motors, and "field control" may be conveniently effected through changes in the speed of the motor M by variation of its shunt field-winding current or of the battery voltage. Wherever a dynamotor is available, the generator G may be mechanically connected thereto, as illustrated in Fig. 2, and the speed of the dynamotor may be varied by manipulating its shunt field winding 4. It should be noted that the latter case is relatively simple in that the method of "field control" permits of the omission of a number of the main-circuit switches that are employed in many systems of the prior art. Moreover, the customarily employed main-circuit reversing switch may be omitted, by the utilization of the small motor-field reversing switch RS, as in Fig. 1, to reverse the direction of rotation of the motor-generator set, thereby obviating the necessity of switching heavy currents. In these ways, the cost of the systems just described will probably not be as great as those of the usual types. However, where a dynamotor is employed as motive power for the small generator, as in Fig. 2, it is not desirable to reverse the direction of rotation. In such a case, the reversing switch for the main motor may be kept small by designing the main motor field F for fairly high voltage and, therefore, for small current. A reversing switch RS1 for compensating reversal in main-circuit current through the generator field winding 21 is also preferably employed.

It will also be understood that, in the case of interpole motors, the interpole field windings may be treated similarly to the main field windings in the system of Fig. 1.

In Fig. 3 is shown a system quite similar to that illustrated in Fig. 1, the chief differences residing in the provision of a coöperating series field winding 22 for the motor M. In the system under consideration, the field windings of the auxiliary motor M are designed so that, even with a relatively small load on the main motor, the motor M has a highly saturated field, and, therefore, the speed of the motor-generator set will change very little with the main motor load. Thus, under normal operating conditions, the series field winding 22 of the auxiliary motor has relatively small influence upon the characteristic curves of the main motor. However, if the main current is interrupted, a relatively weak field flux is supplied by the shunt field winding 16 alone, thereby increasing the speed of the motor-generator set and, consequently, increasing the energizing current of the main field winding F to any desired extent.

When supply-circuit energy is resumed, the main motor has a relatively strong field flux already established. The system just described will compensate for either temporary or relatively long supply-circuit energy interruptions. In case of short interruptions, the field strength of the main motor is maintained through the agency of the self-induction of the field windings F and 18; while, in case of longer interruptions, the main field strength is maintained as just recited. If desired, the battery B may, in this system, as in several others shown, be charged from the main circuit, by opening a switch 8a and closing a switch 8b; or the generator field winding 18 may be excited from the battery B; if desired.

Fig. 4 discloses another modification, wherein a series-type field winding 22 of the auxiliary motor M is adapted to act differentially with respect to the shunt field winding 16. The generator G, as shown, has a series-type field winding 21. The armature A is further connected to the supply circuit through a portion of a control switch CS2 and a resistor R1, which is paralleled by the coöperating stationary and movable contact members 26 and 27, respectively, of a suitable no-voltage graduated release switch NV2. The series-connected actuating coil 28 of the switch, when energized through the control switch CS2, is adapted to maintain contact between the contact members 26 and 27, which contact is not broken until a spring member 7 within the dash-pot 2 separates these contact members a predetermined period of time after the interruption of supply-circuit energy.

The system just described, while not suitable for maintaining the main field energization, as set forth in connection with the system shown in Fig. 3, during relatively long energy interruptions, will however, produce a relatively steep main-motor speed characteristic, which is usually very desirable. This steep characteristic is obtained by reason of the fact that, whenever the armature current increases, the field-winding voltage and, therefore, the field current is increased, because of the increased excitation of the generator series field winding 21, as well as the increased speed of the motor-generator set that is caused by the field-weakening action of the differentially-connected motor field windings 22 and 16.

The function of the resistor R1 and switch NV2 is to act as a protective device in case of the above-mentioned relatively long energy interruptions. Upon the deënergization of the actuating coil 28 of the switch, the spring 7 gradually raises the movable contact member 27, until the contact members 26 and 27 separate after a predetermined period of time. If supply circuit energy is then resumed, the interposition of the resistor R1 in circuit will prevent an excessive instantaneous flow of current, if the control switch CS2 still occupies an operative position. The switch NV2 will then be closed by the energization of its actuating coil 28. As in Fig. 3, the battery may be charged from the main motor circuit by opening the switch 8a and closing the switch 8b.

I do not wish to be restricted to the specific circuit connections or arrangement of parts herein set forth, as various further modifications may be made within the spirit and scope of my invention. I desire, therefore, that only such limitations shall be imposed as are indicated in the appended claims.

I claim as my invention:

1. In a system of control, the combination with a supply circuit, and a main dynamo-electric machine having an armature and a field winding, of an auxiliary motor-generator for exciting said field winding, and means for operating said motor-generator irrespective of interruption of supply-circuit energy, both motor and generator of said motor-generator being excited in accordance with main-armature current in such manner as to materially modify the operation of the motor-generator after the resumption of supply-circuit energy.

2. In a system of control, the combination with a supply circuit, and a main dynamo-electric machine having an armature and a field winding, of an auxiliary motor-generator for exciting said field winding, and means independent of said supply circuit for driving said motor-generator, a plurality of field windings for both motor and generator of said motor-generator being energized independently of the supply circuit, and a field winding being energized in accordance with the main-armature current to materially modify the effect of one of said field windings upon a resumption of supply-circuit energy after a temporary interruption thereof.

3. In a system of control, the combination with a supply circuit, and a main dynamo-electric machine having an armature and a field winding, of an auxiliary motor-generator for exciting said field winding, and a storage battery for driving said motor-generator, a plurality of shunt field windings for said motor-generator being connected across the armatures thereof, and a second field winding for the auxiliary motor being connected in the main-armature circuit, whereby the speed and voltage of the motor-generator are materially changed upon the resumption of supply-circuit voltage after a temporary interruption.

4. In a system of control, the combination with a supply circuit, and a main dynamo-electric machine having an armature and a field winding, of an auxiliary motor-generator for exciting said field winding, and means for operating said motor-generator irrespective of interruption of supply-circuit energy, at least one armature of said motor-generator being excited in accordance with main-armature current in such manner as to materially modify the operation of the motor-generator after the resumption of supply-circuit energy.

In testimony whereof, I have hereunto subscribed my name this 24th day of Oct. 1917.

RUDOLF E. HELLMUND.

Copies of this patent may be obtained for five cents each, by addressing the "Commissioner of Patents, Washington, D. C."